United States Patent [19]

Evans

[11] Patent Number: 5,209,041
[45] Date of Patent: May 11, 1993

[54] CHUB PACKAGING MACHINE CLIPPING MECHANISM

[75] Inventor: Alfred J. Evans, Raleigh, N.C.

[73] Assignee: Delaware Capital Formation, Inc., Apex, N.C.

[21] Appl. No.: 817,516

[22] Filed: Jan. 7, 1992

Related U.S. Application Data

[62] Division of Ser. No. 601,322, Oct. 22, 1990, Pat. No. 5,077,955.

[51] Int. Cl.[5] .............................................. B65B 51/05
[52] U.S. Cl. .................................. 53/138.4; 53/576; 29/243.57
[58] Field of Search ................. 53/576, 138.4, 567; 29/243.56, 243.57; 452/37

[56] References Cited

U.S. PATENT DOCUMENTS

| | | | |
|---|---|---|---|
| 3,133,288 | 5/1964 | Ohgren | 29/243.56 |
| 3,293,736 | 12/1966 | Tipper | 53/138.4 X |
| 3,717,972 | 2/1973 | Niedecker | 53/138.4 |
| 4,001,926 | 1/1977 | Velarde | 29/243.56 |
| 4,218,861 | 8/1980 | Marz | 53/138.4 |
| 4,675,945 | 6/1987 | Evans et al. | 53/138.4 X |

Primary Examiner—John Sipos
Attorney, Agent, or Firm—Allegretti & Witcoff, Ltd.

[57] ABSTRACT

A packaging machine applies clips to rope sections of filled tubular casing to form clubs. In such a machine, a new clipping mechanism includes a piston-in-piston structure. Clip jaws are linked to the external piston to be driven by that piston. A punch is affixed to the internal piston. The punch is driven partially by the external piston as the internal piston "rides along", and partially by the internal piston. The punch is guided, in part, by punch guides present in the clip jaws, when closed. Also in the packaging machine, a cut-off knife is driven, and voider plates are driven in part by non-cylindrical and therefore consistently aligned pistons in non-cylindrical cylinders.

6 Claims, 10 Drawing Sheets

CHUB PACKAGING MACHINE CLIPPING MECHANISM

This is a divisional of application Ser. No. 07/601,322 filed Oct. 22, 1990, now U.S. Pat. No. 5,077,955 issued Jan. 7, 1992.

BACKGROUND OF THE INVENTION

This invention relates in part to packaging machinery, and more particularly to packaging machines for food processing, such as stuffing machines of the type which make sausage chubs and similar stuffed meat and stuffed food products. Most particularly, this invention relates to an improved clipping mechanism in and for a chub forming machine.

Sausage making and the making of similar stuffed meat and food products has become highly automated. As a result of significant, valuable research in the United States, a variety of machines have been successfully developed for the automated and semi-automated production of chubs from processed meats and casing. One such machine is disclosed in U.S. Pat. No. 4,766,713, issued on Aug. 30, 1988 to Alfred J. Evans, for a Packaging Device Including Dual Clip Attachment Apparatus, incorporated by reference. In a machine such as that disclosed in the identified patent, sausage material is pumped from a vat to a stuffing horn assembly. Shirred casing is applied over the end of a stuffing horn. The casing and material pumped to the horn leave the horn simultaneously, through a casing brake. The stuffing material fills the casing and the casing maintains the material under slight pressure. The casing brake permits the casing to exit under uniform tension. Adjacent the casing brake, dual product clippers intermittently act to void sections of the casing which have passed the brake, into voided "rope" sections. The clippers clip each rope section to define the end of an exiting chub and the beginning of the next chub.

Other notable machines are disclosed in U.S. Pat. No. 4,675,945 issued on Jun. 30, 1987 to Alfred Evans et al., U.S. Pat. No. 4,847,953 issued on Jul. 18, 1989 and U.S. Pat. No. 4,887,332 issued on Dec. 19, 1989, all incorporated by reference. In the machines of the identified patents, clipping mechanisms are provided for supplying and deforming metal clips about the voided casing.

While the machines of U.S. Pat. No. 4,766,713 and the other identified patents have proven highly desirable, continued advances have been desired in clipping mechanisms, to decrease the size of the mechanisms, reduce the number of parts of the mechanisms, simplify adjustments of the mechanisms, reduce the air volume and pressure requirements of the mechanisms, extend the life of the mechanisms, and package the mechanisms into self-contained units.

SUMMARY OF THE INVENTION

In and for a chub packaging machine, the invention is directed, in a principal aspect, to an improved clipping mechanism comprising a support structure, first and second piston members, clip jaw members, a die member, mechanical link members, and pressurizing means such as a pneumatic source.

Filled tubular casing moves through the chub packaging machine of the invention. The path of movement of the filled tubular casing defines a longitudinal axis. This axis is a significant physical direction for understanding orientation of the structure of the invention.

The support structure of the invention defines a first cylinder, and the first cylinder extends in a direction which is transverse, relative to the longitudinal axis. Within the first cylinder, the first piston member moves transversely under force of pressure. A second cylinder is internal to the first piston, and it also extends in the transverse direction. A second piston member is located in the second cylinder. The second piston member is also movable transversely, in the second cylinder, under force of pressure.

The clip jaw members are pivotally mounted to the support structure for pivoting relative to the support structure toward each other, to and from a closed position. A die member for clip deformation is located on one of the clip jaw members. The mechanical link members are pivotally mounted to the first piston member, for movement with the first piston member, and pivotally attached to the clip jaw members, for driving the pivoting of the clip jaw members relative to the support structure. Thus, transverse movement of the first piston under force of pressure pivots the clip jaw members closed.

A punch is affixed to the second piston member, for transverse movement with the second piston member, into and out of cooperative interaction with the die member while the clip jaw members are in the closed position.

The pressurizing means pressurizes the first and second cylinders in coordination, to move the first and second pistons in the first and second cylinders in coordination, to advance the clip jaw members to the closed position, and thereafter to drive the punch into cooperative interaction with the die. Clips fed successively to the mechanism are driven under action of the punch around successive rope sections of the filled tubular casing and deformed to clip the rope sections. The clip jaw members and punch are intermittently retracted during passage of filled tubular casing along the path of movement, to provide for movement of the filled tubular casing.

This principal aspect and other principal aspects of the invention are more full appreciated by a reading of the detailed description of the preferred embodiment of the invention, which follows.

BRIEF DESCRIPTION OF THE DRAWING

The accompanying drawing illustrates the preferred embodiment of the invention. The machine of the drawing is not the only form which the invention as claimed may take. The drawing and the following detailed description of the preferred embodiment are intended to limit the claims only as consistent with the law of claim interpretation, whereby claims are interpreted in light of the specification and drawing.

The description which follows refers to the componentry of the machine in such spatial terms as "front", "rear", "upper", "lower", "left", "right", etc. Terms such as these, which depend of the specific spatial orientation of the components, are intended for the aid of the reader, and except as incorporated into the claims, not as a limitation on the possible orientation of components in any possible alternate, but covered, embodiment of the invention. Except as consistent with the law of claim interpretation, the drawing and following description are only illustrative of the invention.

For orientation of the reader to the drawing, and for ease of beginning of reading of the following detailed description, a brief description of the drawing is as follows.

DETAILED DESCRIPTION OF THE PREFERRED EMBODIMENT

Figure 1:
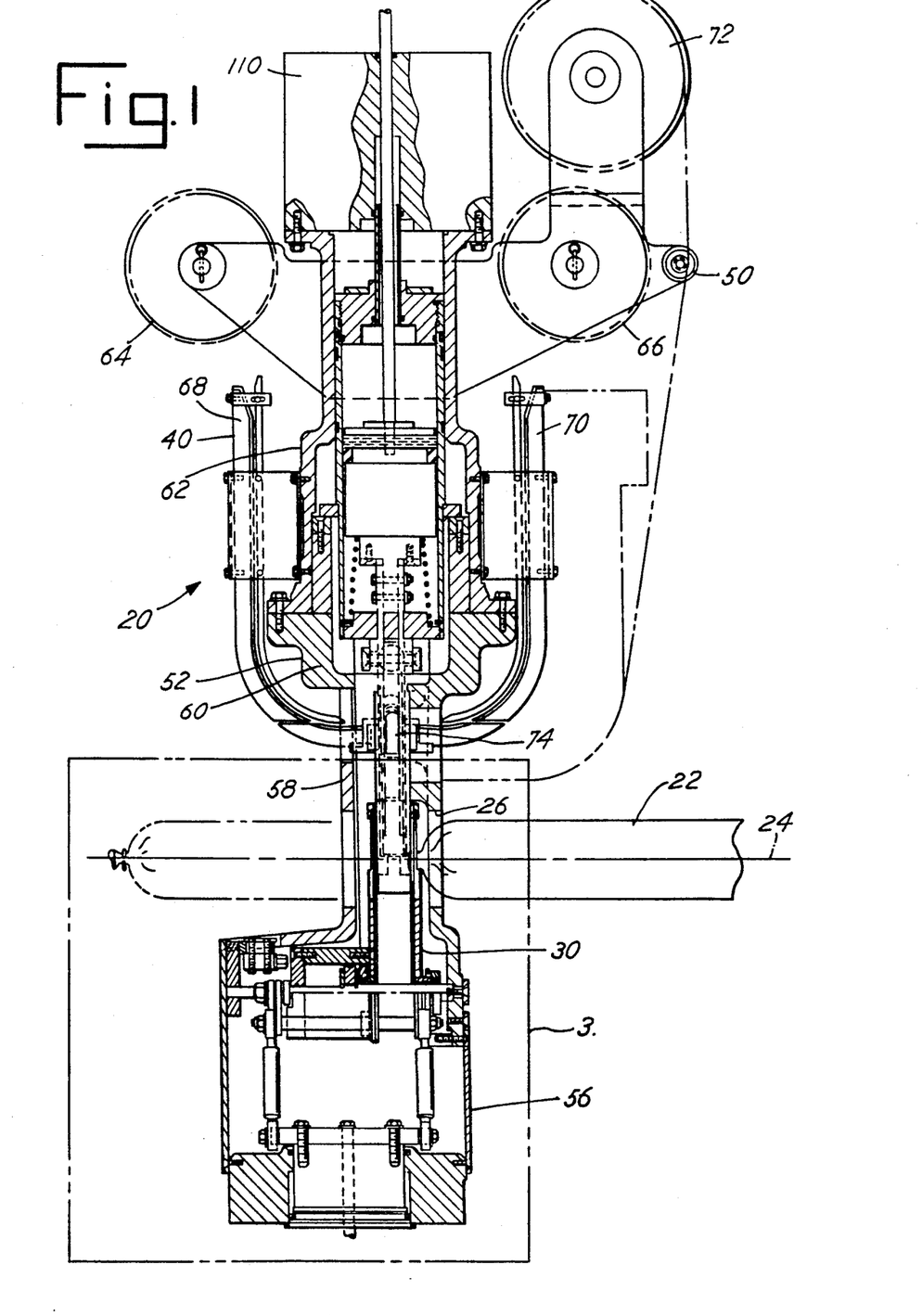
FIG. 1 is a cross-sectional view of the clipping mechanism which constitutes the preferred embodiment of the invention, taken along the longitudinal centerline of the clipping mechanism and splitting it in half, front to rear.
Figure 14:
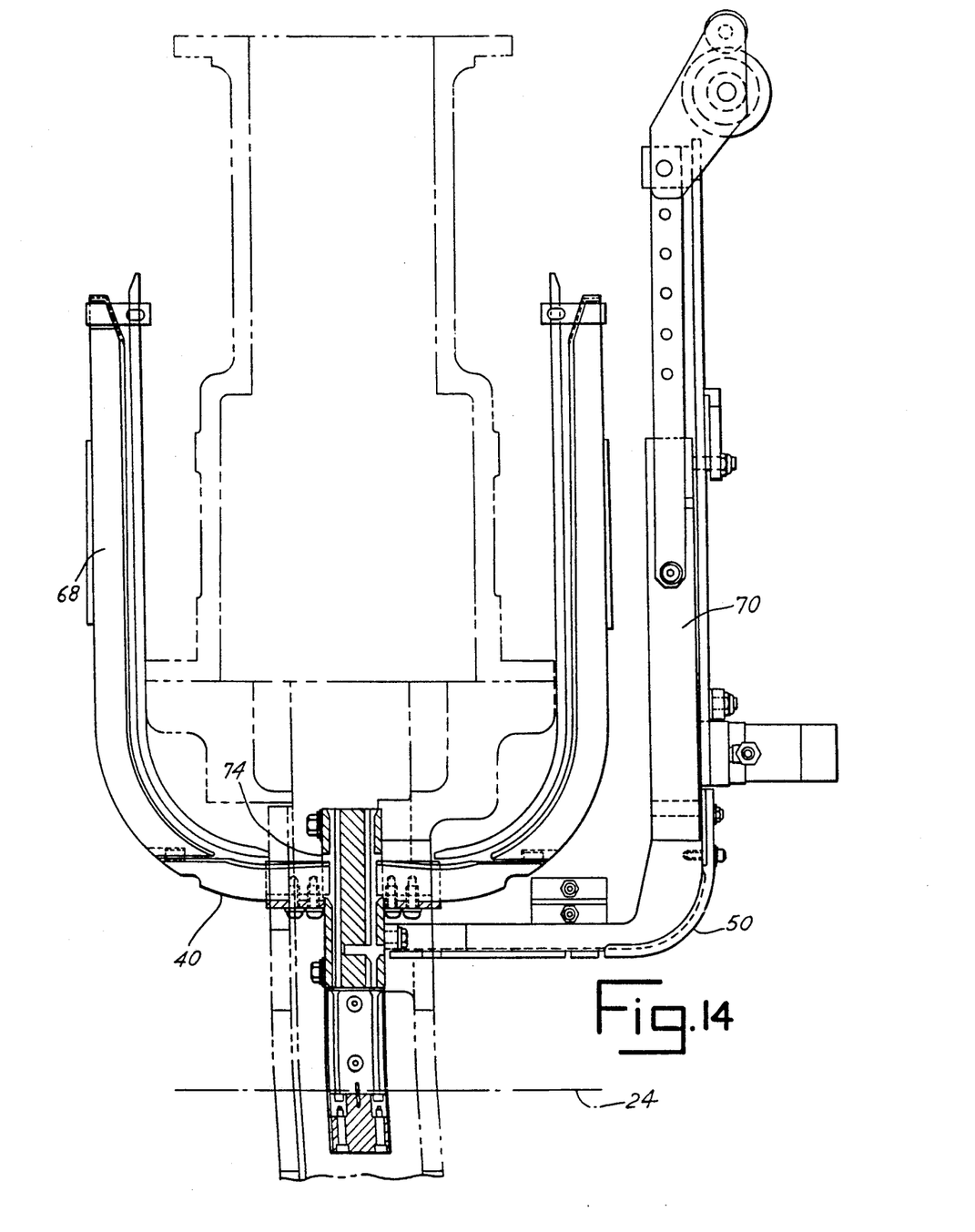
FIG. 14 is a partial cross-sectioned plan view of the feed mechanism of the preferred embodiment.

Referring to FIG. 1, the preferred form of the invention is embodied in a clipping mechanism generally designated 20. The mechanism 20 is positioned along the path of movement of filled tubular casing 22. The path of the casing 22 defines a longitudinal axis 24, and extends through a throat area 26 of the mechanism 20. The path of the casing is typically horizontal, and the mechanism 20 as preferred extends generally above the path. A voiding mechanism 30 accompanies the clipping mechanism 20 and extends below the path. A clip feed mechanism generally 40, as in FIGS. 1 and 14, and a loop feed mechanism 50, also as in FIGS. 1 and 14, also accompany the clipping mechanism 20.

Figure 2:
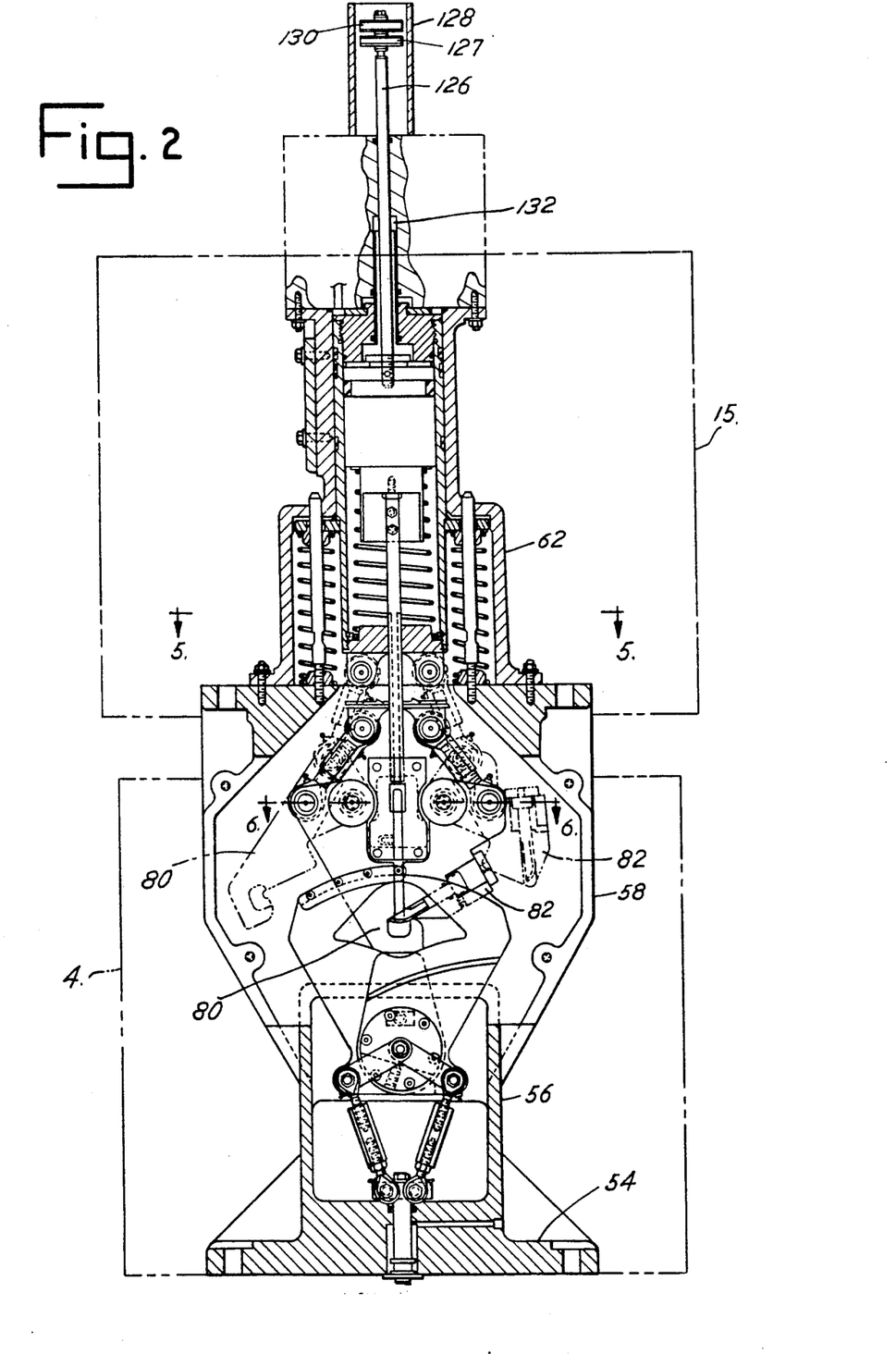
FIG. 2 is a cross-sectional view of the clipping mechanism, taken along the transverse centerline of the clipping mechanism from the left, or product discharge side of the mechanism, of the mechanism as in FIG. 1, illustrating both the closed and fully open positions of the clip jaws of the embodiment.

Referring to FIGS. 1 and 2, the clipping mechanism 20 includes a main assembly within a main housing 52. A foot plate 54 provides for mounting of the clipping mechanism 20 where desired. Rising over the foot plate 54, a voider portion 56 of the housing 52 contains the voiding mechanism 30. Continuing upward, a longitudinally narrowed and transversely widened portion 58 of the housing 52 contains pivotal clip jaws, to be described. The main housing 52 terminates in a mounting lug 60.

An upper cylinder housing 62 contains an upper cylinder assembly. The upper cylinder housing 62 is fastened atop the main housing assembly 52. Clip reels 64, 66 and clip rails 68, 70 of the clip feed mechanism 40 are mounted to the sides of the upper cylinder housing 62. A loop reel 72 of the loop feed mechanism 50 is also mounted to the cylinder housing 62. Clips are fed from the reels 64, 66 onto the clip rails 68, 70 and by the rails 68, 70 to a clip window 74 in the portion 58 of the main housing 52.

Internally, the upper cylinder housing 62 opens into the main housing 52, through the central portion of the mounting lug 60.

Figure 15:
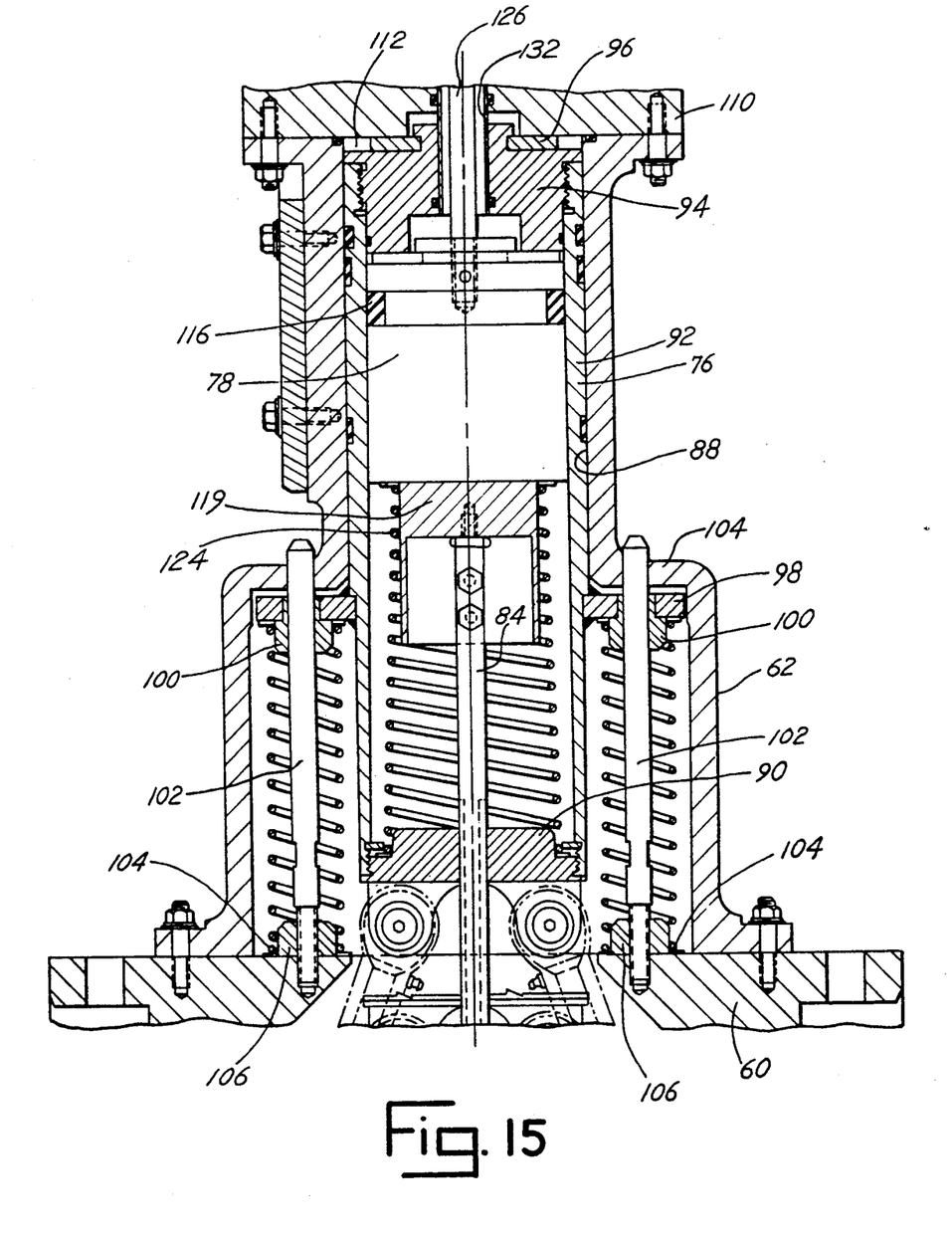
FIG. 15 is an enlarged, sectional view of the structure in the area of box 15 in FIG. 2, illustrating locations of punch and clip jaw driving pistons for the retracted position of the clip jaws and punches.
Figure 16:
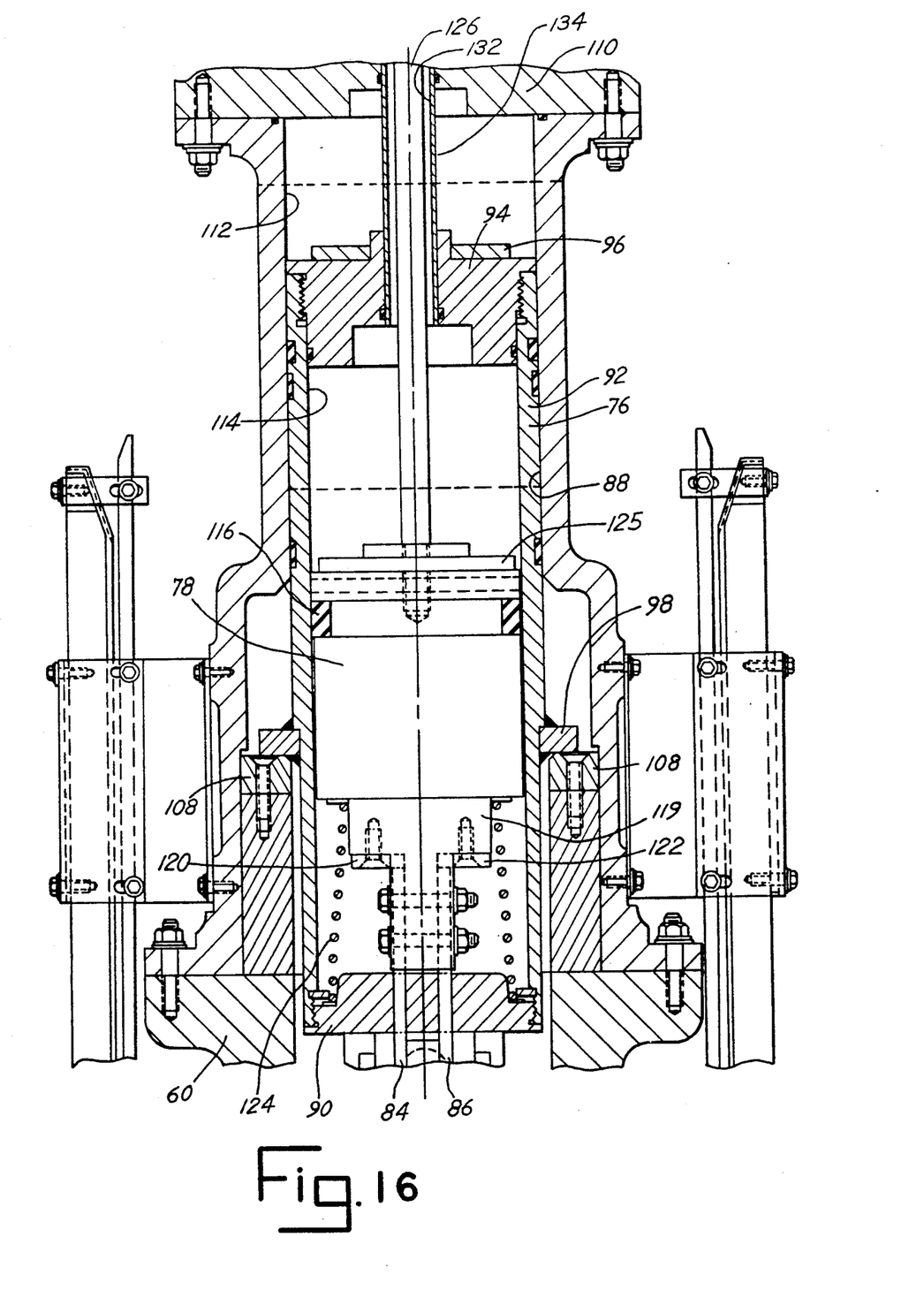
FIG. 16 is an enlarged, side sectional view of the same structure as in FIG. 15, illustrating locations of driving pistons for the advanced positions of the clip jaws and punches.

Briefly, with reference to FIGS. 15 and 16, and with detail to follow, a pair of pneumatically driven pistons 76, 78 in the upper cylinder assembly drive pivotal clip jaws 80, 82, shown in FIGS. 2, 4 and 7-13, in the main assembly and punches 84, 86, which move through the housings 62, 52. The pistons 76, 78 drive the jaws 80, 82 and punches 84, 86 in a coordinated motion, into and out of the throat area 26. With each movement into the throat area, the jaws close and the punches advance, driving clips against dies on the jaws, and deforming the clips around rope sections of the filled tubular casing.

Referring again to FIGS. 15 and 16, the first piston 76 is located in a first cylinder 88, defined within the upper cylinder housing 62. The cylinder 88 extends transversely to the axis 24. The piston 76 is comprised of a first connector plug 90, an elongated, annular wall member 92, a second connector plug 94, an annular bumper 96, a flange 98, and spring pilots 100.

As shown by comparison of FIGS. 15 and 16, the first piston 76 is advanced and retracted within the first cylinder 88. The retracted, or "stand-by", position of FIG. 15 retracts the clip jaws 80, 82 and punches 84, 86. The advanced, or clipping, position of FIG. 16, advances the clip jaws 80, 82, and partially advances the punches 84, 86. The linearity of the motion of the first piston 76 is controlled by two guide pins 102, fastened to the mounting lug 60 and extending transversely into the upper cylinder housing 62. The guide pins pass through guide pin openings in the spring pilots 100 and flange 98. The guide pins also pass through a wall section 105 of the housing 62, to orient assembly of the housing 62 to the lug 60.

Advancement of the piston 76 occurs under action of pneumatic pressure from a pneumatic manifold 110. An air transfer port opens from the manifold 110 into the space 112 above the piston 76. Pressurized air through this port drives the piston 76.

Return of the piston 76 to the retracted position occurs under action of helical springs 104, on venting of the port. The springs 104 are located along the pins 102, with ends positioned on spring pilots 100 and 106. The springs 104 are compressed during advancement of the piston 76, and recoil to return the piston 76. Advancement of the piston 76 terminates on contact of the flange 98 with bumpers 108 inside the housing 62, as in FIG.

16, and retraction terminates on contact of the bumper 96 with the bottom of the pneumatic manifold 110.

The second piston 78 is located within a second cylinder 114, designated in FIG. 16, defined within the first piston 76 by its elongated, annular wall 92 and connector plugs 90, 94. A seal 116 is located in a recess of the piston 78 for sealing against the inner surface of the wall 92. Punches 84, 86 are affixed to an extension 119 of the piston 78, with punch thrust plates 120, 122 interposed, in the transverse direction, between the punches 84, 86 and piston extension. The piston extension also pilots a helical return spring 124, as does the connector plug 90 of the first piston 76. Partial advancement of the second piston 78 occurs by advancement of the first piston 76. Advancement is completed under action of air pressure from the manifold 110. A connecting rod 126 extends from above the manifold, as seen in FIG. 1, through the manifold 110 and to the piston 78. As shown in FIG. 2, the rod 126 is surmounted by an adjustable crimp stop 127 with an associated guard 128 and lock 130, for fine adjustment of the position of termination of advancement of the piston 78. The crimp stop 127 and lock 130 are in the nature of two lock nuts. Actual driving of the piston 78 occurs on introduction of pressurized air into the air transfer tube 132 of the manifold 110, and sleeve 134 of the first piston 76, best seen in FIG. 16.

Retraction of the piston 78 occurs on recoil of the spring 124. A bumper 125 limits retraction within the cylinder 114.

Advancement of the second piston 78 occurs in two stages, (a) first by advancement of the first piston 76 (the second piston "riding along"), followed by (b) advancement under air pressure from the manifold 110. Advancement of the second piston 78 in two stages provides for a timed full advancement of the clip jaws 80, 82 before full advancement of the punches 84, 86. The clip jaws advance into readiness for full advance of clips by advancement of the punches. Partial advancement of the second piston 78 by advancement of the first piston 76 also economizes pressurized air requirements.

Figure 7:
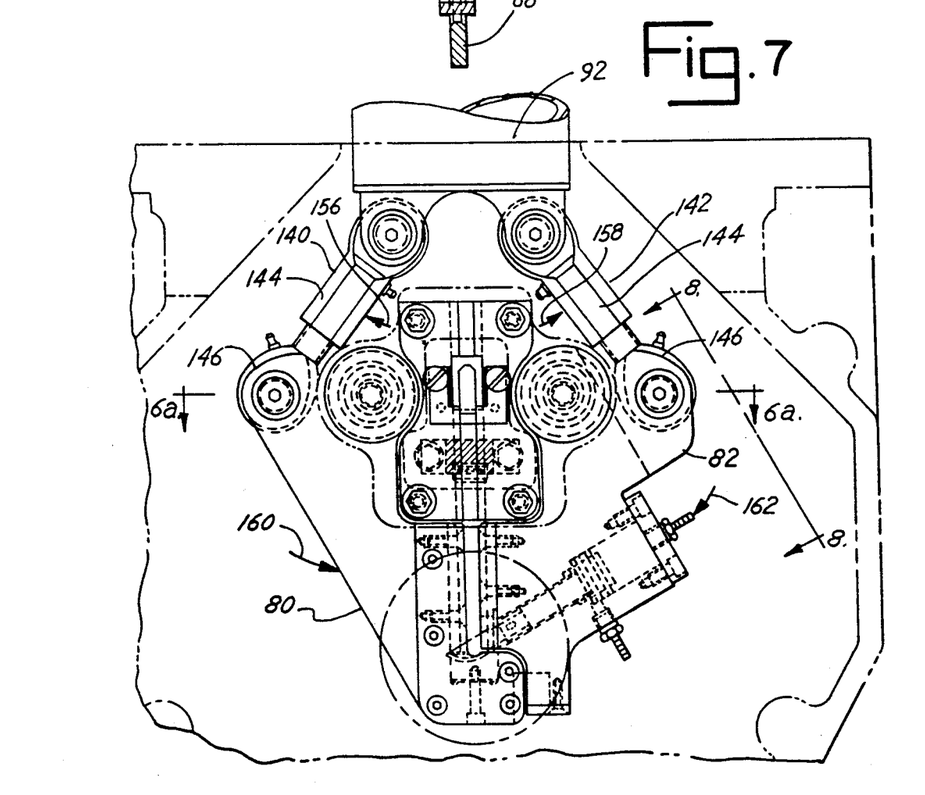
FIG. 7 is a partial view, similar to FIG. 2, depicting the clip jaws of the preferred embodiment in a closed, clipping, position.
Figures 8, 9, 10, 11, 12, 13:
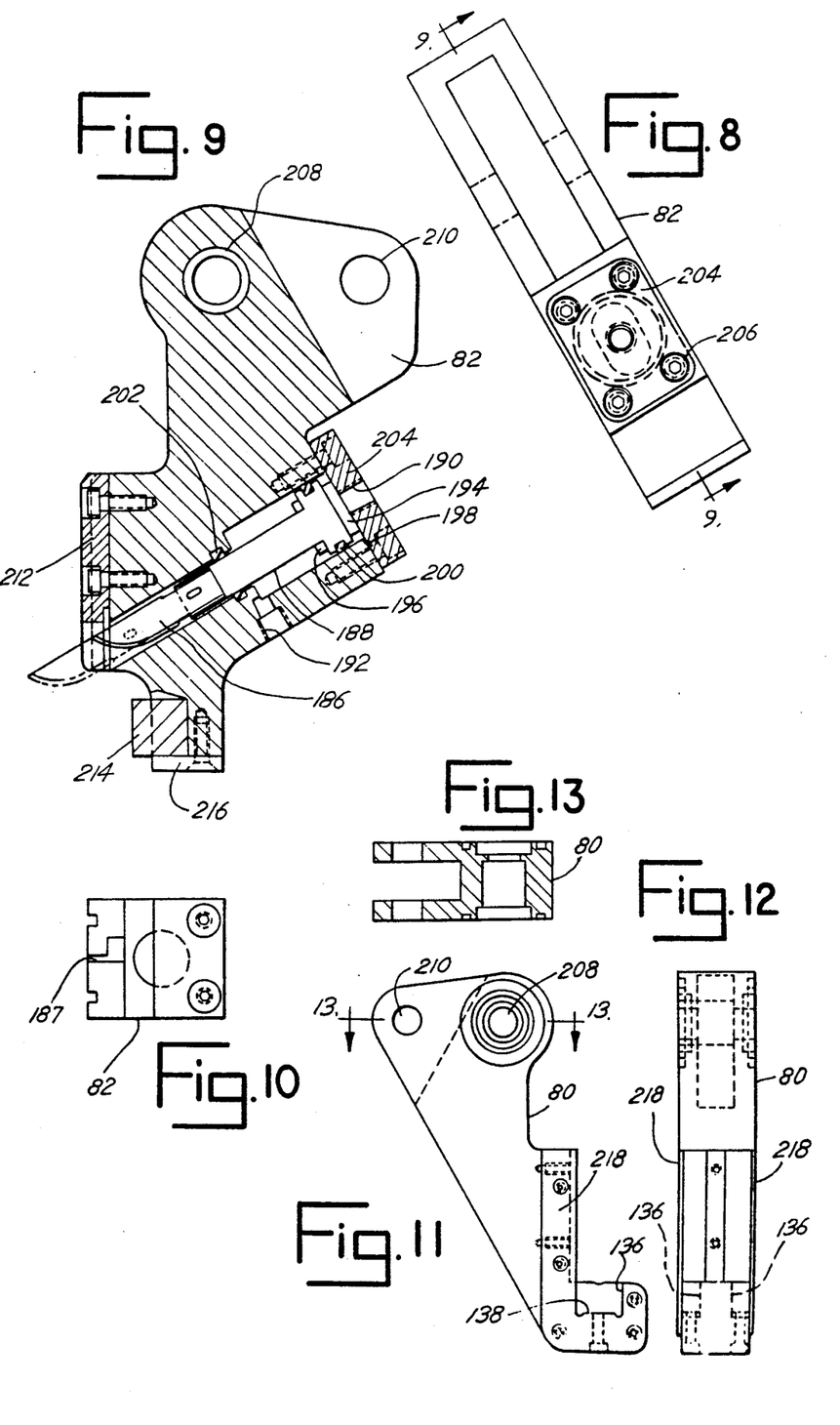
FIG. 8 is a view of a clip jaw of the preferred embodiment, taken along line 8—8 of FIG. 7.
FIG. 9 is a cross-sectional view of the clip jaw of FIG. 8, taken along line 9—9 of FIG. 8.
FIG. 10 is an isometric view of the bottom of the clip jaw of FIG. 9.
FIG. 11 is a side elevation view of the clip jaw other than the clip jaw of FIGS. 8, 9 and 10.
FIG. 12 is an isometric view of the side of the clip jaw of FIG. 11.
FIG. 13 is an isometric view of the top of the clip jaw of FIG. 11.

Referring to FIG. 7, clip jaws 80, 82 meet in the advanced position to define punch channels for guidance of the punches 84, 86. Referring to FIGS. 11 and 12, the clip jaw 80 defines die pockets 136 with dies such as 138 therein. The dies act to crimp clips which are driven into the dies by the punches.

Figure 6:
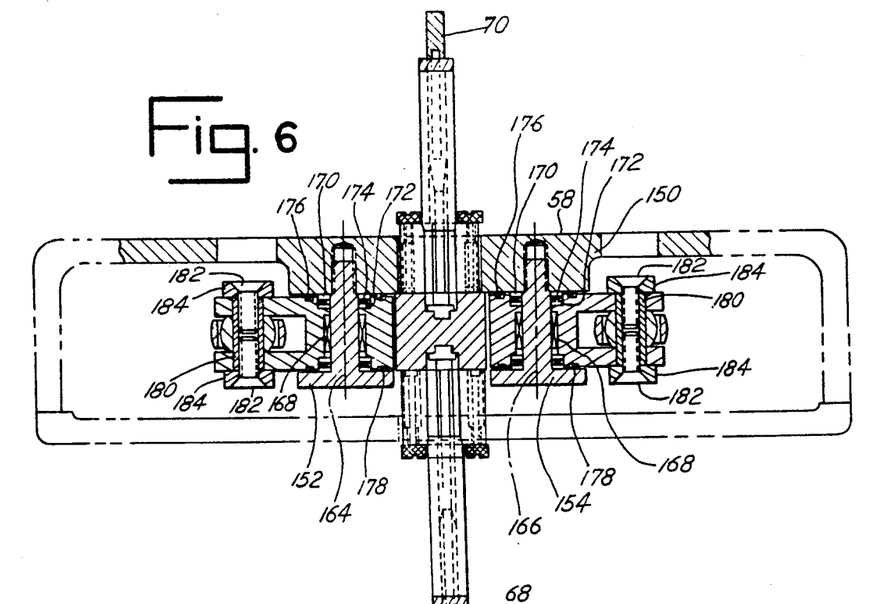
FIG. 6 is a cross-section taken along line 6—6 in FIG. 2.

Referring again to FIG. 7, the clip jaws 80, 82 are linked to the first piston 92 by links 140, 142 each comprised of telescoping link members 144, 146. Referring to FIG. 6 as well as FIG. 7, the clip jaws 80, 82 are also pinned against an internal mounting boss 150 of the portion 58 of the housing 52. (As stated in the Brief Description of the Drawing, FIG. 6 is a cross-section through FIG. 2. FIG. 6 is also a cross-section through FIG. 7, as designated by section line 6a—6a.) The pivot pins 152, 154 by which the jaws 80, 82 are pinned to the boss 150 provide for rotation and no linear movement of the jaws 80, 82. Rotation occurs around pivot axes 164, 166 parallel to the longitudinal axis 24. Thus, linear advancement of the piston 92 causes pivoting movement of the links 140, 142 in the general direction of arrows 156, 158 in FIG. 7, causing pivoting of the jaws 80, 82, in the direction of arrows 160, 162 in FIG. 7, around pivot axes 164, 166 in FIG. 6.

Radial needle bearings 168, thrust washers 170, 172, thrust bearings 174, seals 176, 178, pins 180, and retaining screws and washers 182, 184 complete mounting of the jaws 80, 82 to the link members 140, 142 and boss 150.

Referring to FIGS. 8–10, clip jaw 82 includes a pneumatically driven cut-off knife 186, driven in a slot 187 by a knife piston and rod 188. The cross-sectional shape of the piston is not round. The piston is elongated in one axis and narrowed in the other. This shape provides non-rotation of the piston itself, eliminating the need for additional guiding hardware to prevent the knife blade from rotating. This eliminates a substantial number of components.

The piston and rod combination 188 advances and retracts under action of air pressure fed into ports 190, 192, respectively. Bumpers 194, 196, seals such as 198, 200, 202 and a cylinder cap 204 with fasteners 206 complete the assembly. Both jaws 80, 82 define pivot pin bores 208 and link screw bores 210 for pins 152, 154 and screws 182, respectively. Jaw 82 also incorporates a clip channel block 212, a bumper 214, and a bumper retainer 216; jaw 80 incorporates die pocket covers 218.

Action of the knife 186 is co-ordinated with action of the pistons 76, 78 by conventional pneumatic controls, to result in a sequence of operation of clip jaw advance, punch full advance, knife advance, knife retraction, partial punch retraction and full punch and clip jaw retraction.

Referring to FIGS. 1, 2, 3 and 4, the voider assembly 30 acts to gather the casing into voided rope sections and to pull additional casing about which the clips are placed. Voider action provides an area into which the clipper jaws, previously described, can rotate, for placement of the clips about rope sections. The major subassemblies that comprise the voider assembly are a spreading voider subassembly, a fixed voider subassembly, a gathering cylinder subassembly, a spreading cylinder subassembly and a gathering adjustment subassembly.

Figure 3:
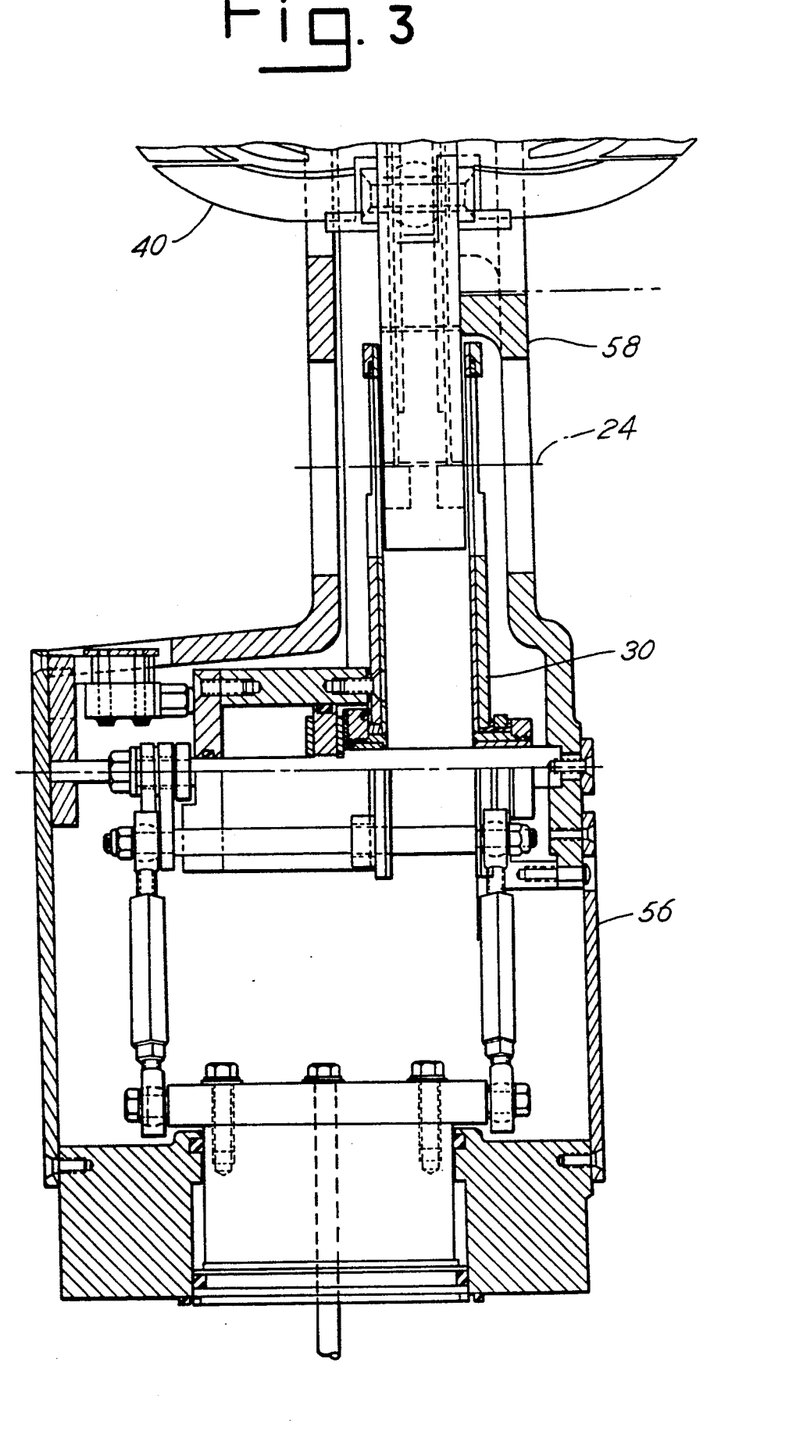
FIG. 3 is an enlarged, side sectional view of the structure in the area of box 3 in FIG. 1, including structure of an accompanying, separate invention.
Figure 4:
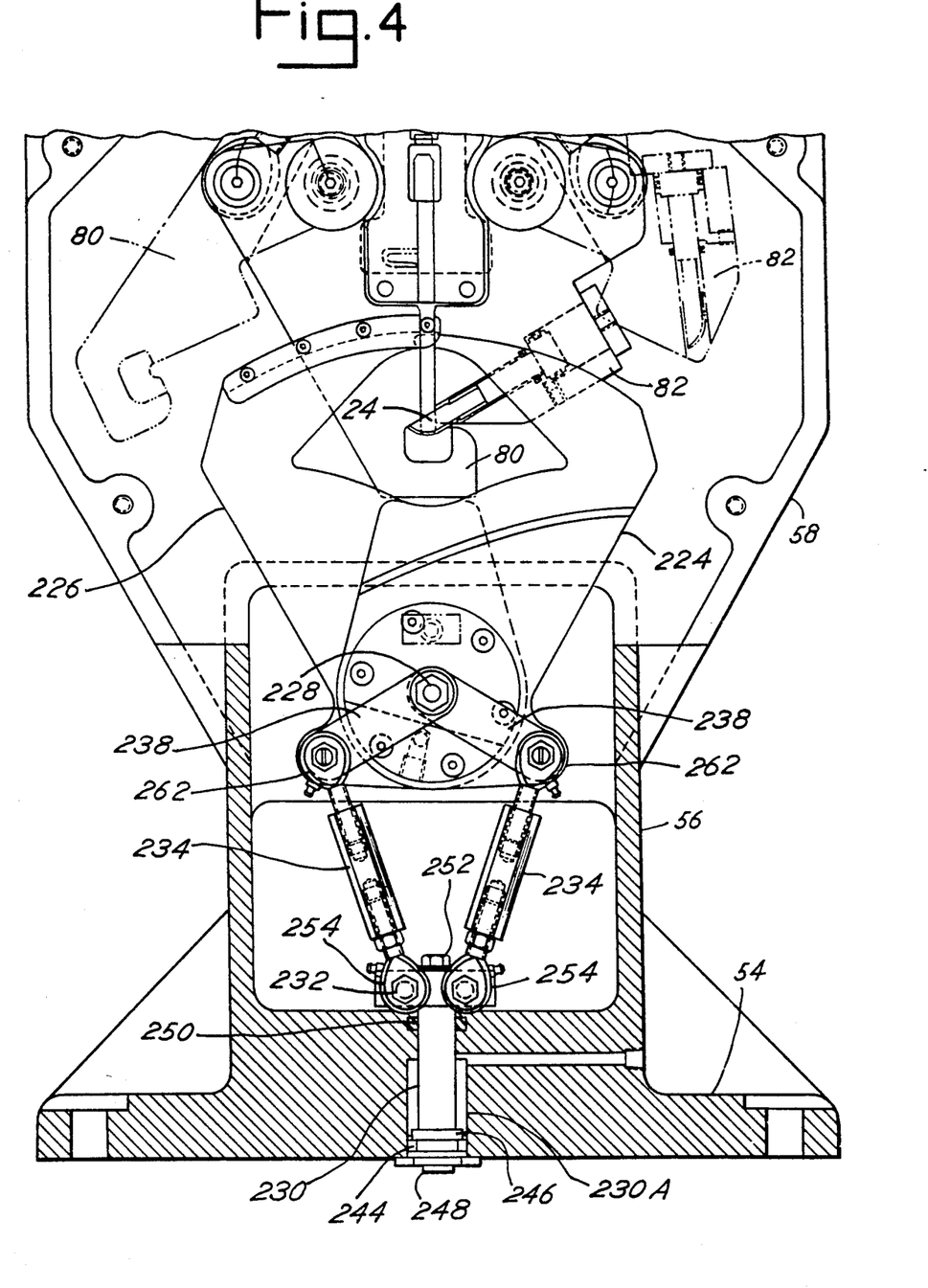
FIG. 4 is an enlarged, sectional view from the same direction as FIG. 2, in the area of box 4 in FIG. 2, again illustrating both the closed and the fully open positions of the clip jaws of the embodiment.
Figure 5:
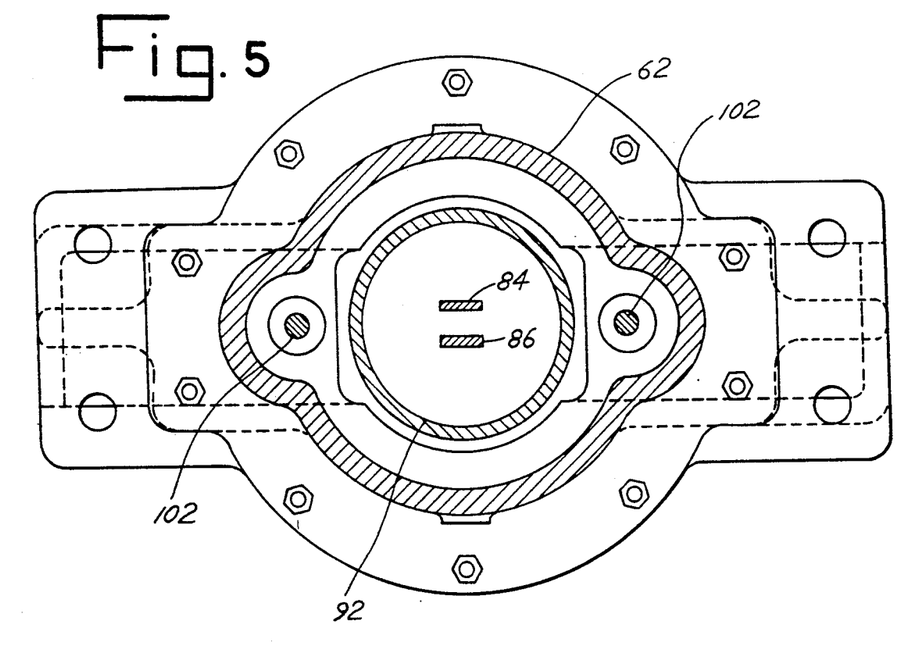
FIG. 5 is a cross-section taken along line 5—5 in FIG. 2.

The fixed voider subassembly includes fixed voider plates 220, 222, as in FIG. 3, which are fixed and do not move longitudinally. The spreading voider subassembly includes spreading voider plates 224, 226, as in FIGS. 3 and 4, which are located against the fixed voider assembly plates 220, 222 in a rest position. In operation, both pairs of plates 220, 222, 224, 226 are rotated closed, about an axis 228 parallel to axis 24. The spreading voider plates are then pulled away from the fixed voider plates, longitudinally, and to the left as shown in FIG. 3.

Extension of a gathering piston 230 upward in a vertical direction from the position in FIG. 3 causes a drive bar 232 to be lifted. The drive bar 232 is attached to the top of the gathering piston 230. This in turn forces pairs of turnbuckles 234, 236 to be raised, causing rotation of pairs of drive links 238, 240 about a support piston rod 242.

The gathering cylinder 231 is comprised of a cylinder and piston combination. The piston 230 has a radiused end with flatted sides (compare FIG. 4 with FIG. 3). This shape of the piston provides non-rotation as a feature and eliminates the need for guide rods, guide pins and bushings, for the purpose of assuring the smooth operation of the drive linkage. The rod area of the piston is also of the same geometry and this provides for the accuracy of the entire drive hardware.

A piston seal 244 and a bumper 246 are contained on the piston. A gathering adjustment rod 248 passes completely through the gathering piston. A rod seal 250 seals against the piston, and is located in a recess in the cylinder housing. The drive bar 232 is attached to the top of the piston by way of attachment bolts 252 and adjustment rod 248. Rod end bearings 254 and the turnbuckles 234, 236 are attached to the drive bar 232, to operate the voiders into and out of their open and closed positions.

Guide rods 260 pass through the drive links and gathering plates. Rod end bearings 262 attach to the guide rods 260 and the spherical inner ring ends of the bearings 262 are clamped by locking nuts to the guide rods. As a result, the guide rods are stationary relative to the drive links.

Referring to FIG. 3, the right-most end of the support piston rod 242 is retained in a rod pocket in the main support of the housing 52, and is retained in that position by a retaining screw and washer. The screw passes into a threaded portion in the end of the rod 242. The left-most end of the support piston rod 242 is supported by a support plate 266. The support plate 266 is held in place on a face of the main support by retaining screws. The left most end of the support piston rod is led into a rod bore contained within the support plate 266 and is not retained within the rod bore by any retaining screws. This freedom from fastening allows free floating of the end of the rod 242, eliminating tolerance accumulation across the housing.

The left-most drive links 238 are retained about the support piston rod 242 by a stop ring, a series of flange washers and a thrust washer. The stop ring is secured to the shaft by way of a locked-in screw such that it is located in a positive fashion. The screw, stop ring, links and washers are removable so that the spreading cylinder assembly can be slipped off the support piston rod when necessary for overhaul or repairs.

The fixed voider plates 220, 222 are held in a fixed location by a retaining bracket which affixes the plates relative to the main support casting and locks them into position longitudinally.

The two fixed voider plates 220, 222 constitute a right-hand-outer voider plate, the plate 220, and a right-hand-inner voider plate, the plate 222. "Inner" and "outer" are used, respectively, to refer to (a) the plates of each pair of plates 220, 222 and 222, 226 which are adjacent to each other immediately to the center of the assembly, and (b) the plates which are "outside" the other plates. Thus, the plate 220 to the extreme far right in FIG. 3 is considered an outer plate while the plate 222 immediately next to it and between it and the next plates 224, 226 is considered an inner plate. This nomenclature is employed for purpose of referring to differences between plates.

A bushing housing is welded to the right-hand-inner voider plate 222, into which a bushing is pressed. This bushing rotates about the support piston rod 242. The right-hand-outer voider plate is sandwiched against the right-hand-inner voider plate and rotates about a flange washer. The flange washer is abutted against a retaining bracket. Rotating within the retaining bracket is another flange washer. A retaining nut presses against the right-most face of the adjacent flange washer. The retaining nut is run in until the clearance between all of the various elements is reduced to a minimum necessary to allow for rotation. The flange washers are press fitted in place and are supported on the outside diameter. All the rotational load is taken against the inside surface, which is the larger of the surfaces. Thrust loads are taken by the faces of the flange washers.

The radially outward edges 263 of the voider plates are held captive to each other by retaining strips which are bolted to the right-hand-inner and left-hand-inner voider plates. These strips are of a Delrin (R) glass-filled material, as are the flange washers.

At the juncture of the right-hand plates where the rod end bearings 262 are attached, each guide rod 260 has a step diameter to receive a rod end bearing. The step diameter area is also a zone in which a guide rod attachment hole has been defined in each plate. Thus, when a rod end bearing 262 is attached and secured with a nut on the end guide rod 260, the inner ring of the rod end bearing, being wider than the outer ring, is forced against the right-most face of the inner plate. The left-most face of the inner plate is then driven against the step shoulder on the guide rod, securing the inner plate to the rod and also preventing rotation of the rod itself relative to the plate. No bushings are required at this point, simplifying the design. All of the rotation during the opening and closing of the voiders is taken by the juncture of the inner and outer rings.

The right hand outer plate is attached in a similar fashion. A driver is defined on the plate along with the guide rod attachment hole. When the piston 230 is lifted in a vertical direction, the turnbuckles 234, 236 are lifted vertically as well. Lifting of the turnbuckles 234, 236 causes a force to be applied to the guide rods 260, pivoting the plates 220, 222 about the support piston rod 242. The plates rotate about a common axis and thus cause the voider opening between them to be brought to a common point.

A bushing housing is welded to the common axis of the two left-hand plates 224, 226 as defined by the support piston rod 242. A glass filled Delrin (R) end bushing and a shaft seal are contained within the bore of the bushing housing. The bushing housing has a on its surface to prevent axial movement of the bushing. A seal retainer plate prevents axial movement of the bushing and seal in a left direction. A flange washer rotates about the outside circumference of the bushing housing. The left-hand-outer voider plate 224 is press fit to the outside diameter of the shank of the flange bushing. The plate 224 as well as the flange bushing are secured relative to each other to prevent rotation, by way of retaining screws. To prevent air escapement from the spreading cylinder subassembly, a seal is positioned to seal against the left-most space of the flange washer and the right-most space of the cylinder itself.

A retaining nut retains the left-hand-outer and left-hand-inner voider plates to each other to provide an assembly. This retaining nut is screwed onto the threaded portion of the bushing housing of the left-hand-inner voider plate. A seal retainer plate is secured to the left hand of the face of the retaining nut. Preloading of the voider plates to each other is controlled by the amount of torque placed on the retaining nut. Rotation of the left-hand-inner voider plate is by way of a bushing which has been press fitted into the inner diameter of the bushing housing, which is welded to the plate. Rotation of the left-hand-outer voider plate is by way of the flanged bushing contained within the left-hand-outer voiding plate and this rotates about the outside diameter of the bushing housing of the left-hand-inner voider plate.

The spreading cylinder assembly is bolted to the spreading voiding plates by attachment screws, through the left-hand-outer voider plate only. Lateral motion of the plates, along the axis defined by the support piston rod, is generated while coaxially, force is placed about the bushing area. The spreading cylinder assembly consists of a cylinder with seals on opposing ends. The seal to the right-most end is to prevent leakage between cylinder as well as the flange washer. The previously mentioned retaining nut of the voider assembly further contains a seal in its right-most space which also seals against the flange washer. A piston has been threaded onto the support piston rod, and contains a piston seal which is trapped between flanges on the piston itself. Bumper pads are contained on both of the faces of the piston, to suppress the dynamic loads which are imposed otherwise. A cylinder end plate closes off the left-most end of the cylinder. The end plate is sealed to the support piston rod by way of a shaft seal. Porting of air into the cylinder on opposite sides of the piston is handle by a port in the right-most end of the cylinder as well as a port contained within the end plate for the left-most end. Porting of air into the right-most port causes the plates to be forced against each other to the filling position while porting of air to the left-most port causes the plates to move to the left extreme or spreading position. Sealing of the cylinder end plate to the cylinder is by a seal as depicted on the left-most extremity of the cylinder. The left-most position of the spreading cylinder assembly is detected by a sensor which makes contact with the left outer face of the cylinder end plate.

A glass filled Delrin (R) retaining strip retains the spreading voider plates to each other. The retaining strip is secured to the inner plate by way of retaining screws. The actuation of the plates for opening and gathering is controlled by a sleeve which is welded to the voider plates on an ear which is a projection from the voider plates. A bushing is contained within the sleeve, and is press fit into the sleeve and guided along the guide rods. Retaining screws are attached to the cylinder assembly.

The guide rods are supported at the extreme right end by the right-hand voider plates. Progressing toward the left, the guide rods pass through the bushings and sleeves contained on the left hand voider plates. From this point they pass onto the links 238. The guide rods 260 are mounted to the links 238 in the same manner as they are attached to the right-hand voider plates in that a shoulder abuts against the inside face of the link and a locking nut clamps the inner ring of a rod end bearing to the opposite face through a through hole.

A stop ring is secured to the support piston rod. A flange washer is abutted against the stop ring. The flange washer is press fit to the inside diameter of the through hole in a link 238 is slipped over the support piston rod. Another link 238 is placed against the face of that flange washer. A thrust washer is then placed against the extreme left end of the assembly and a locking nut is run onto the threaded portion, pre-loading everything in the direction of the stop ring.

The flange bushings and links fully support the guide rods at both ends and guide the guide rods through arcs of travel.

The preferred embodiment and the invention are now described in such full, clear, concise and exact terms as to enable a person of skill in the art to make and use the same. To particularly point out and distinctly claim the subject matter regarded as invention, the following claims conclude this specification.

What is claimed is:

1. In a packaging machine for applying clips to rope sections of filled tubular casing to form clubs, the path of movement of the filled tubular casing defining a longitudinal axis, an improved voiding mechanism comprising:
   a support structure;
   fixed voider plates with means for fixing the position of the fixed voider plates along the longitudinal axis;
   spreading voider plates;
   a gathering cylinder;
   a gathering piston in the gathering cylinder, movable along a piston line transverse to and intersecting the longitudinal axis, the piston line and longitudinal axis defining a longitudinal plane;
   a drive rod extending generally parallel to the longitudinal axis attached to the gathering piston and movable therewith;
   turnbuckles pivotally attached to the ends of the drive rod and movable in planes transverse to the longitudinal plane;
   guide rods extending generally parallel to the longitudinal axis, the turnbuckles mounted on the guide rods;
   paris of drive links mounted on the guide rods and movable in said transverse planes;
   a support rod extending generally parallel to the drive rods, the support rod supported on the support structure;
   a support rod cylinder attached to the spreading voider plates and extending along a portion of the support rod;
   a spreading piston mounted on the support rod within the spreading cylinder, the spreading cylinder movable over the spreading piston;
   the drive links and voider plates mounted to the support rod, the fixed voider plates affixed to a pair of the drive links, the spreading voider plates movable longitudinally with the spreading cylinder, and the fixed voider plates and spreading voider plates movable transversely under action of the gathering cylinder.

2. A voiding mechanism as in claim 1 further comprising means for moving the spreading voider plates along the guide rods and longitudinal axis, and toward and a way from the fixed voider plates.

3. A voiding mechanism as in claim 1 in which the gathering piston and cylinder have flatted sides, whereby the gathering piston substantially does not rotate about the piston axis.

4. A voiding mechanism as in claim 1 in which the guide rods are stationary relative to the drive links.

5. A void mechanism as in claim 1 in which an end of the support rod is supported in a rod pocket, as a free-floating end.

6. A voiding mechanism as in claim 1 further comprising retaining strips which hold edges of the voider plates captive to each other.

* * * * *